March 7, 1967 B. L. BRYSON 3,308,334
TRACE DISTORTION CORRECTION
Filed June 28, 1963 6 Sheets-Sheet 1

INVENTOR
BOBBY L. BRYSON
BY Maurice Klitzman
ATTORNEY

TRACE DISTORTION CORRECTION

Filed June 28, 1963 6 Sheets-Sheet 2

TRACE DISTORTION CORRECTION

March 7, 1967 B. L. BRYSON 3,308,334

TRACE DISTORTION CORRECTION

Filed June 28, 1963 6 Sheets-Sheet 4

TRACE DISTORTION CORRECTION

Filed June 28, 1963 6 Sheets-Sheet 6

3,308,334

TRACE DISTORTION CORRECTION

Bobby L. Bryson, Poughkeepsie, N.Y., assignor to International Business Machines Corporation, New York, N.Y., a corporation of New York Filed June 28, 1963, Ser. No. 291,508
12 Claims. (Cl. 315—24)

This invention relates to apparatus for correction of distortions in the trace of a display on the face of a cathode ray tube. More particularly this invention concerns the correction of distortions in which both the magnitude and direction of the cathode ray tube deflection contribute to the correction required, pin cushion distortion being the most prevalent of this type.

Trace distortion of the pin cushion type is that distortion which occurs when the curvature of the display face of a CRT is not ideally related to the input signal. In such a system, distortion appears in proportion to the amount of beam deflection away from center. The proportional amount of distortion increases with the magnitude of deflection.

A pure example of pin cushioning arises when the face of a CRT is flat, the input signal varies linearly with the dimensions of the picture to be displayed, and the cathode ray beam is brought to every point on the tube face with beam deflections of only small angular amounts. In such a system the time of beam travel depends upon the magnitude of deflection. Any beam deflection away from the center of the tube results in beam travel through the theoretically proper point of intersection with the face to a more distant point established by the intersection of the beam with the flat faced tube. The difference from where the beam theoretically should have contacted the cathode ray tube and the point of actual contact with the flat face tube is a distortion. An input signal theoretically proper to trace a square will, on the face of the flat face tube in the system as described, trace not a square but a series of lines which bend toward the center somewhat, creating a display suggestive of a pin cushion. This is shown in FIG. 1 in which the inside square is the display which theoretically should appear whereas a somewhat larger bow sided square is the display which does appear on a flat faced tube due to the trace distortion known as pin cushioning.

The apparatus of this invention is concerned with trace distortions of the pin cushion type and has utility when any correction scheme is implemented which is a function of the product or quotient of two or more variables. The subject matter of the invention involves not only the scheme of correction but also the implementation of the scheme of correction.

It is a particular object of this invention to produce a correction signal without the use of an elaborate combination of function generators to obtain, for example, A⊗B by the formula $$A \otimes B = \frac{(A+B)^2 - A - B)^2}{4}$$

It is a particular object of this invention to obtain a correction signal without the use of vacuum tube and other special purpose multipliers, which may be inaccurate.

It is a general object of this invention to create sufficiently accurate trace distortion correction with a minimum of structure and a minimum of complications arising from the structure.

It is a further object of this invention to create a trace distortion correction circuit with fewer inherent problems of construction and with improved compatibility between the circuit elements.

It is another object of this invention to create a trace distortion correction circuit which can be implemented with accuracy and with improved stability within the requirements of a visual system.

It is an additional object of this invention to create a pin cushion correction circuit which is more economical and efficient than known correction techniques.

It is further object of this invention to create a more practical pin cushion correction circuit which is accurate within the requirements of a visual system.

It is a more specific object of this invention to create a trace distortion system which can be implemented by logrithmic techniques, but which avoids the inaccuracies which are inherent in the structural generation of pure logarithm functions.

In accordance with one aspect of the invention the economies and simplicities of logarithms are utilized while errors which normally would result from the attempted structural implementation of a logarithm scheme of correction are minimized. Function generators can be designed to be relatively accurate in generating logarithmic and antilogarithmic functions when the input is moderate because at moderate input the logarithmic and antilogarithmic functions vary relatively moderately with input. Function generators of this kind are used, even though the output at relatively small inputs is inaccurate. Means are provided to suppress correction which would appear at the deflection system of the cathode ray tube when deflection in the direction of correction is small and the correction signal would be inaccurate. Since distortion increases with deflection, the correction system is accurate within the requirements of a visual system even though some corrections are suppressed.

Multiplication and division by logarithms require a minimum of function generators, and addition and subtraction requirements are not extensive or complex. Furthermore, errors in small values appearing in a correction scheme can be eliminated by arranging the order of implementation so that relatively large numbers are generated as logarithms where possible. For example $XZ+XY$ can be implemented as logarithm $X+$logarithm $Z+Y$.

In accordance with a more specific aspect of the invention the correction to be applied to correct pin cushion distortion is expressed by the formula $$x \text{ correction} = x\frac{(x^2+y^2)}{\text{Constant}}$$

where $x$ is the deflection in one direction and $y$ is the deflection in the orthogonal direction. Electrical signals representative of $x$ and $y$ are connected to function generators where elements of the scheme of correction are generated. The function $x^2$ is generated. The function $y^2$ is generated. The function logarithm $x$ is generated. The signals representative of $x^2$ and $y^2$ are summed, and the function logarithm $x^2+y^2$ is generated. The logarithm functions are summed and an antilogarithm function generated from the sum. The antilogarith function controls correction in the $x$ direction of the cathode ray tube. Identical circuitry controls correction in the $y$ direction in accordance with the formula $$y \text{ correction} = y\frac{(x^2+y^2)}{\text{Constant}}$$

The single function generated for logarithm $x^2+y^2$ is used in both the $x$ and the $y$ correction circuits and results in a minimum of circuity, because of the dual use and also because of the combined term requires only one antilogarithm function generator in each correction system.

In the preferred embodiment the logarithm functions generated begin at a reference point and increase at substantial slope to the point where a true logarithm curve is approximated. This causes all substantially inaccurate values to be too large. The antilogarithm curve is designed to begin at zero and increase at substantial slope to where a true antilogarithm curve is approximated. Thus, all substantially inaccurate values are to small. Logarithmic functions are allowed to effectuate corrections at a point somewhat ahead of the region of true logarithms because the inaccurate portion of the antilogarithm function offsets the previous inaccuracies and acts to produce a reasonably correct final result.

Also, in accordance with the preferred embodiment of the invention small correction values are isolated from the CRT by a special technique. To enhance accuracy the function generators are designed to operate over relatively large ranges. A constant electrical parameter is provided which opposes currents analogous to the sum of the logarithms. This controls the input to an antilogarithm function generator. The sum of the logarithms must be a predetermined substantial value before any effective input appears at the antilogarithm function generator. Since functions analogous to logarithms are being used, reduction by a constant amount does not effect the relative output of the antilogarithm function generator.

The foregoing and other objects, features and advantages of the invention will be apparent from the following more particular description of the preferred embodiment of the invention, as illsutrated in the accompanying drawings.

Figure 8:
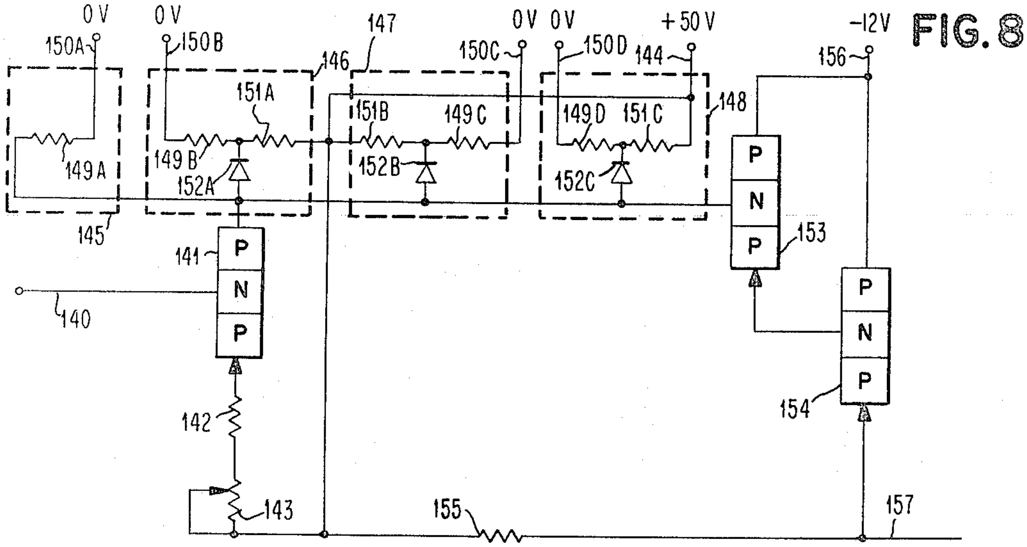
FIG. 8 illustrates the type of logarithm function generator used in the system, two of which are responsive to the rectifiers and two of which are responsive to the inverters.
Figure 8A:
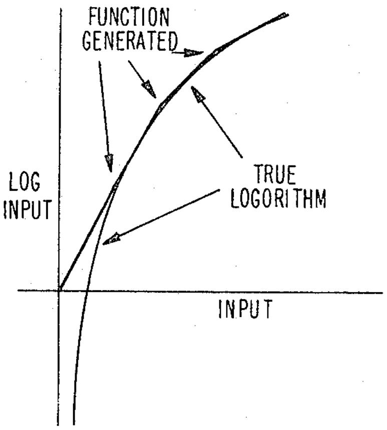

FIG. 8*a* contrasts the function generated by the logarithm function generator with a true logarithm function.

Figure 9:
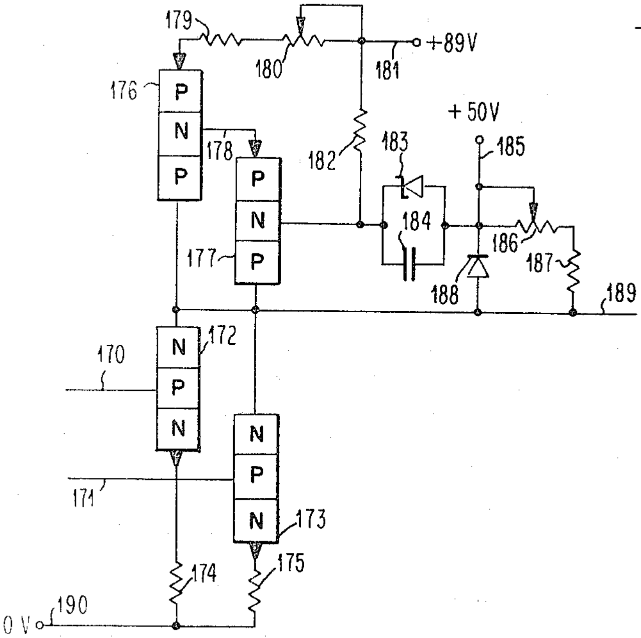

FIG. 9 shows the sum of the logarithms circuit, which responds to logarithm function generators.

Figure 10:
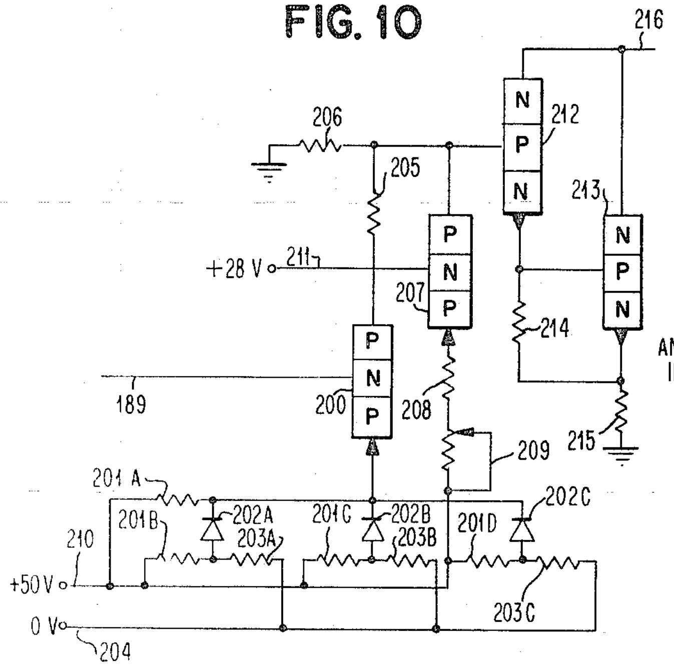

FIG. 10 shows how the antilogarithm function generator of the system responds to the sum of the logarithm to create a correction signal.

Figure 10A:
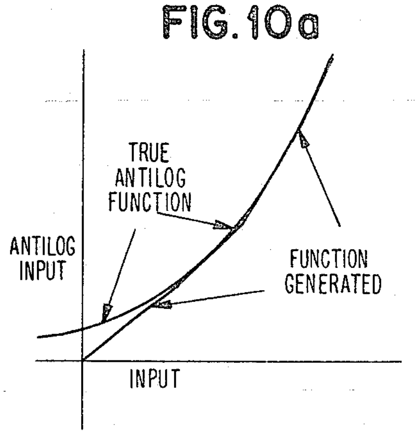

FIG. 10*a* contrasts the function generated by the antilogarithm function generator with a true antilogarithm function.

Figure 11:
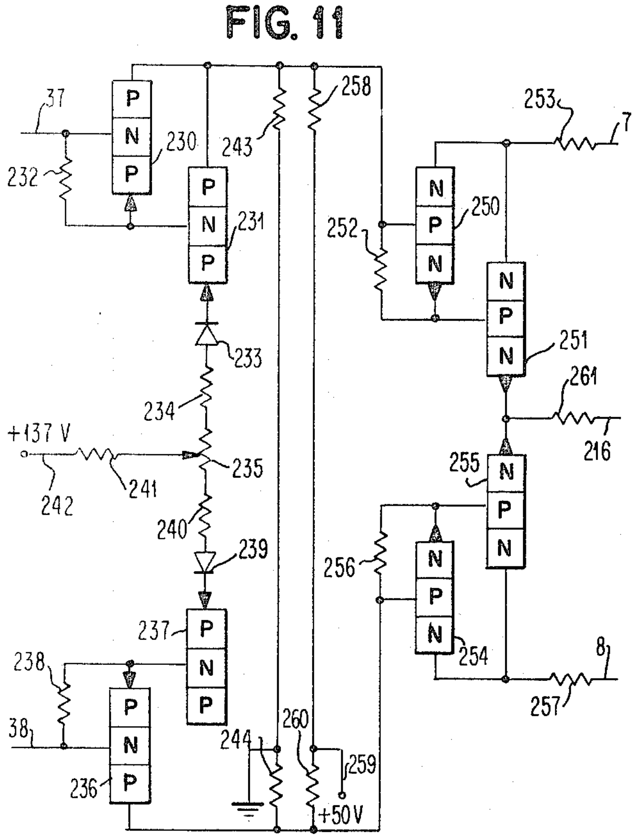

FIG. 11 shows the selection switch and how it routes the correction signal to the proper coil.

Figure 12:
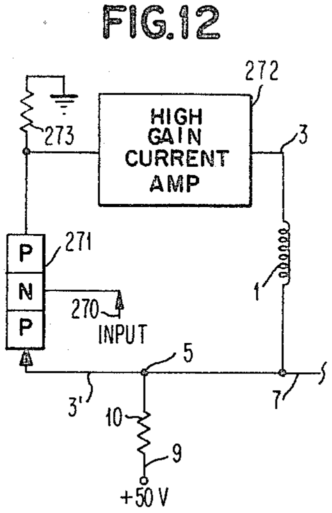

FIG. 12 shows the input circuitry to the yokes, and how the input signal is amplified and corrected.

In the preferred embodiment the deflection yokes are magnetic coils. A cathode ray tube with two orthogonal (meaning simply, right angle relationship) deflection yokes is used. It should be clear, however, that such a particular type of deflection yoke is not critical to this invention. Capacitive deflection could also be corrected by this invention since the invention is applicable to any cathode ray deflection system with deflection means which interact to cause trace distortion.

In the preferred embodiment two coils are used for deflections in each orthogonal direction. These coils are in push-push configuration. An increase in current in each coil by the same amount will not result in a change in deflection. A change in deflection occurs when the current in one coil increases while the current in the second coil decreases.

Also in the preferred embodiment the inputs which primarily control deflection are observed by circuitry which is connected to the deflection coils of the cathode ray tube. The invention, however, is concerned primarily with the implementation of the correction scheme. The inputs which must be processed to obtain correction signals could originate from any convenient location, such as a data register, and be brought directly to the correction system.

*General system*

Figure 2:
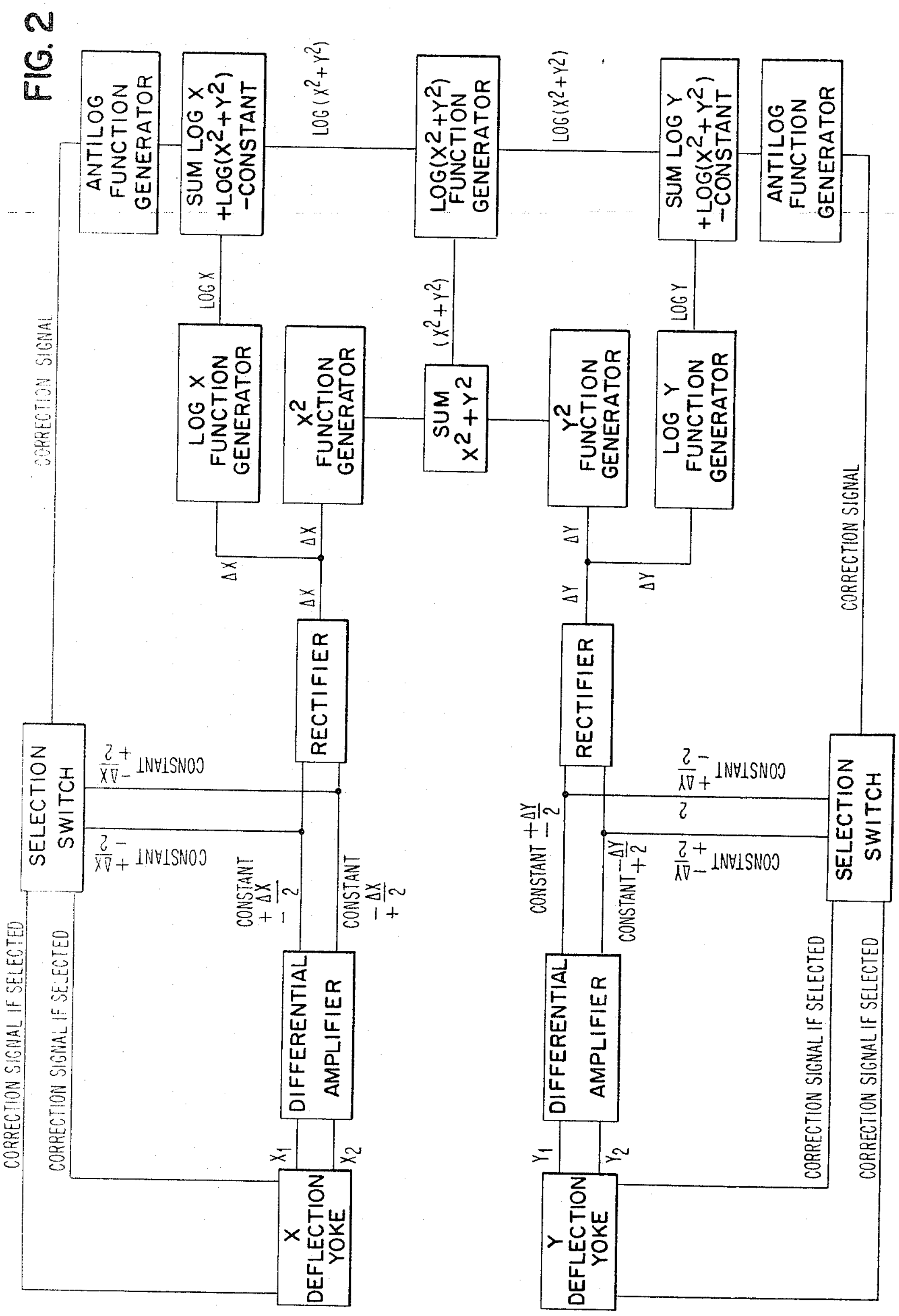
FIG. 2 shows the entire system of correction and the basic interactions of the system.

The general system of the preferred embodiment is shown in FIG. 2. Broadly, the system is a structural means to implement the correction formulas $$x \text{ correction} = x\,\frac{(x^2+y^2)}{\text{Constant}}$$

and $$y \text{ correction} = y\,\frac{(x^2+y^2)}{\text{Constant}}$$

in accordance with the preceding discussion.

Two deflection yokes are shown, one for deflection is a first direction $x$ and one for deflection in an orthogonal direction $y$. As discussed above, two coils in push-push configuration combine to cause deflection in each orthogonal direction. Leads from each of the two coils extend to the differential amplifier associated with the deflection yokes. The signals vary with input to each coil and therefore are denominated $x_1$, $y_1$, $x_2$, and $y_2$.

Further discussion will be confined to the $x$ deflection system. The $y$ deflection system is identical, as clearly shown in FIG. 2. It should be noted, however, that the $x$ correction system and the $y$ correction system share the sum $x^2+y^2$ element and the logarithm $x^2+y^2$ function generator.

The differential amplifier creates a signal indicative of the difference of the inputs to the coils of the yokes. Each output line varies in potential from a constant value a magnitude analogous to one-half of the difference potential. The direction of variation is dependent upon the direction of deflection caused by the input signal to the deflection coils.

The rectifier transforms the signals into a difference signal which has the same characteristics regardless of the direction of deflection. The logarithm of this signal is generated in the logarithm function generator and the square of this signal is generated in the $x^2$ function generator.

The $x^2$ function and the $y^2$ function are summed, and the logarithm generated in the logarithm $x^2+y^2$ function generator. The logarithm signal are added, and, in the specific embodiment, a constant subtracted to render small logarithms ineffective to the antilogarithm function generator.

The correction signal is the output of the antilogarithm function generator, which responds to the sum of the logarithms function. The selection switch directs the correction signal to the one of the two $x$ deflection coils which should receive the correction signal. The selection switch operates in response to the two signals from the differential amplifier.

The details and interactions of the system should be made entirely clear in the following discussion of the elements of the correction system.

*Deflection yokes*

Figure 3:
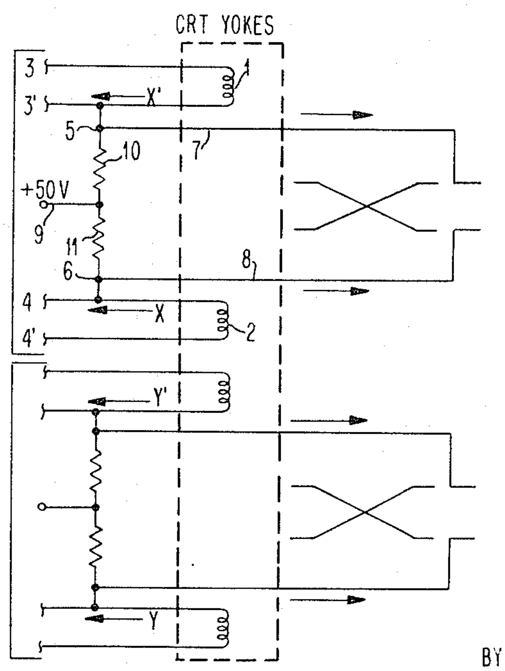
FIG. 3 shows how deflection yokes of the system are operatively connected to the differential amplifier.

Considering circuit operation in function order, the operation begins with the circuits associated with the deflection yokes of the cathode ray tube, shown in FIG. 3. Only the $x$ direction yoke circuitry will be considered in detail since the $y$ circuitry is identical. Deflections in the $x$ and $y$ directions are, of course, displaced 90 degrees.

The deflection yoke circuitry consists of the deflection coils denominated 1 and 2, arranged in push-push configuration. Signal input causes current on leads 3, 3' and 4, 4' in a manner which will be fully described below. Each coil is tapped at the symmetrical points 5 and 6 with leads 7 and 8 connected to the bases of the twin transistors 20 and 21 of the differential amplifier circuit of FIG. 4. The 50 volt power source 9 is separated by identical resistors 10 and 11 from the tapping points 5 and 6.

Assuming no correction signal, potentials at tapping points 5 and 6 describe the current across the coils 1 and 2. Circuit power is supplied by the 50 volt source 9. The leads 7 and 8 control the differential amplifier circuit of FIG. 4 in a manner described immediately below. The leads 7 and 8 are also operatively connected to conduct the correction signal, as will be fully described below.

*Differential amplifier*

Figure 4:
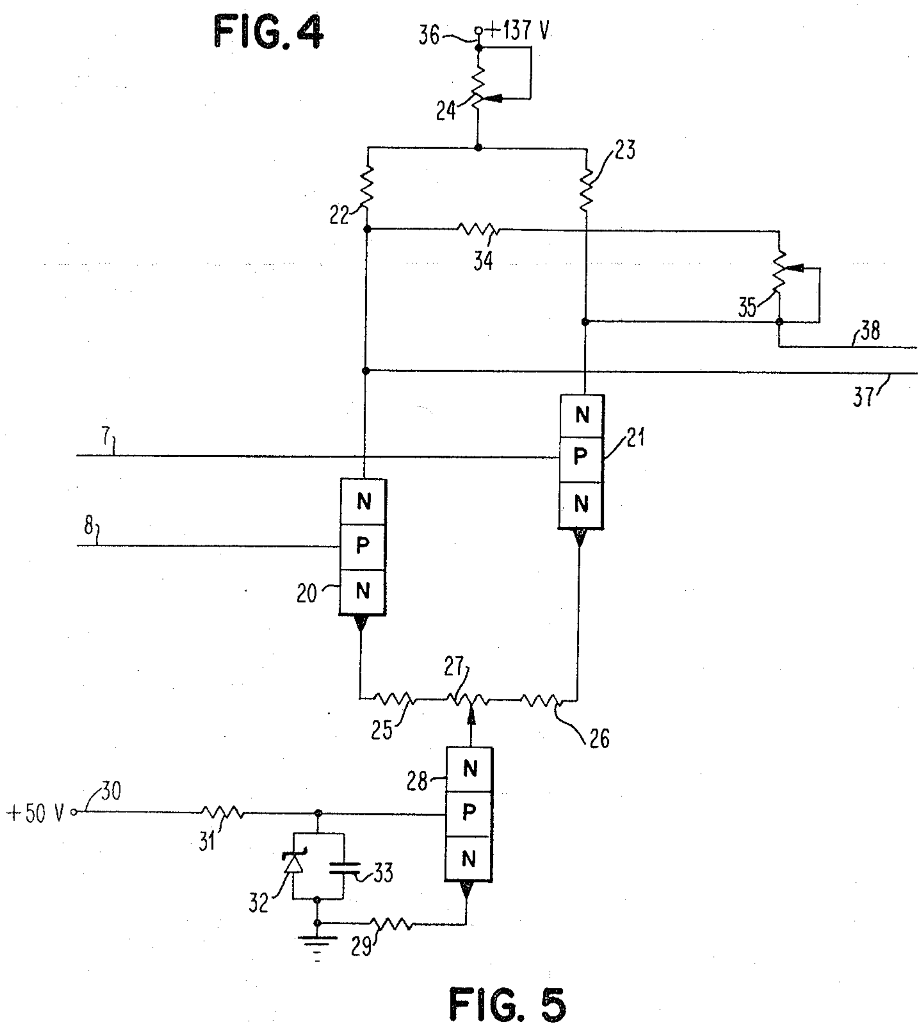
FIG. 4 shows how the differential amplifier processes deflection signals to the rectifier.

The next circuit functionally operative is the differential amplifier circuit shown in FIG. 4. It responds to the input signals observed to give a difference signal indicative of the amount of deflection in one direction. The differential amplifier consists of twin transistors 20 and 21 each having equal magnitude collector resistors 22 and 23 which meet at a level determining variable resistor 24. Transistors 20 and 21 also are connected to equal magnitude emitter resistors 25 and 26. Resistors 25 and 26 are joined by a variable tapped resistor 27, the tap of which is connected to a current establishing transistor 28. Transistor 28 has an emitter resistor 29, and a 50 volt power source 30 provides a constant potential to a resistor 31 which leads to the base. Zener diode 32 is connected from the base to ground and is by-passed by capacitor 33. The collectors of transistors 20 and 21 are connected together through a resistor 34 and a variable resistor 35. Collector power is supplied by the 137 volt source 36. The output of the circuit appears at the output leads 37 and 38, which lead to the rectifier shown in FIG. 5.

Figure 5:
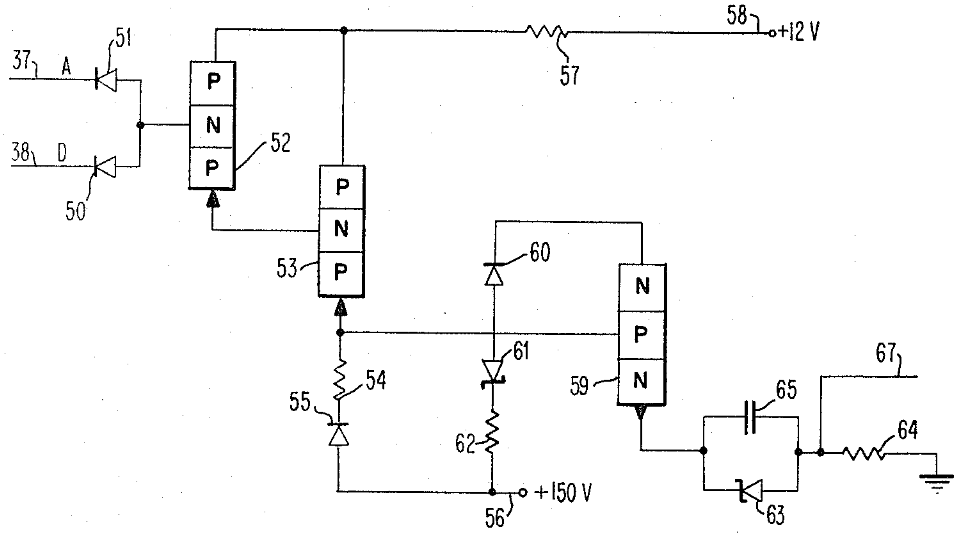
FIG. 5 shows the rectifier and the manner in which it controls the $x^2$ (or $y^2$) function generator and the logarithm $x$ (or $y$) function generator.

The output leads 37 and 38 may be considered an open circuit, for reasons which will be completely clear when the rectifier shown in FIG. 5 is explained. The inputs to the bases of the transistors 20 and 21 are the leads 7 and 8 which, as was established in connection with FIG. 3, are tapped to the deflection coils. When the deflection coils are at the same potential, transistors 20 and 21 are current biased for class A operation by the circuit path through the leads 7 and 8 through the emitter circuits of transistors 20 and 21, through transistor 28 to ground. Variable tapped resistor 27 is adjusted so that twin transistors 20 and 21 carry the same current when the deflection coils are at the same potential. By thus adjusting variable tapped resistor 27 circuit imperfections due to tolerances of the components and similar causes are reduced.

The transistor 28 and its associated circuitry functions as a constant current source. The Zener diode 32 is constantly conducting due to the 50 volt potential input 30. The Zener breakdown potential therefore appears as a fixed value across the base to emitter resistor 29 of transistor 28. The collector current of transistor 28 is a direction function of the base-emitter current of transistor 28. By-pass capacitor 33 is merely to shunt noise and similar transients. Base resistor 31 merely serves to reduce circulating current through Zener diode 32.

The constant current which is generated by transistor 28 is essential in obtaining the differential feature of the differential amplifier circuit. The parameters in the circuits associated with twin transistors 20 and 21 are identical. Thus, when the potentials on leads 7 and 8 are the same, circuit equilibrium is reached only by identical current flowing through each of the twin transistors 20 and 21. In a sense, transistor 28 serves a dual function. First it provides a constant current. Also, the potential from leads 7 and 8 must drop to ground level at the ground side of the emitter-resistor 29 of the transistor 28. Since the collector to emitter potential drop across a transistor is not dependent upon current through the transistor, transistor 28 can and does provide a potential drop which adjusts with changes in potential on leads 7 and 8 to give circuit stability.

The difference signal, which is indicative of the deflection in one direction, $x$, is produced in accordance with the following analysis: When an $x$ deflection is impressed upon the coils of the CRT, potential increases on one of the leads 7 and 8 and to an amount $x1$, while the other of the leads 7 and 8 decreases in potential to $x2$. It is, of course, an inherent property of cathode ray deflection systems of the type under consideration that one of the coil potentials will increase the same amount as the other decreases. The differential amplifier circuit immediately moves toward equilibrium by biasing one of the transistors 20 and 21 to carry more current and the other to carry less current. Each of the twin transistors 20 and 21 with its associated circuit elements is designed to operate in much the manner of a conventional amplifier. The constant current available from transistor 28 therefore now must reduce through one transistor in the amount that it increases through the other transistor 20 or 21 to arrive at circuit balance from the loop from lead 7, through resistors 26, 27, and 25 to lead 8. Stated differently, in order to satisfy both the requirement that constant current flow from transistor 28 and the requirement that potential drop around the loop between leads 7 and 8 through the emitters of twin transistors 20 and 21 be zero, current increases through the transistor 20 or 21 which sees an increased biasing voltage while current in the other transistor decreases an identical amount.

Current through transistors 20 and 21 appears at collector resistors 22 and 23, which are of equal magnitude. Potential at the collectors varies with the potential drop across the resistors 22 and 23. The resistors 34 and 35, connected across the collectors of transistors 20 and 21 present a linear current path which tends to modify the potential difference between the collectors of transistors 20 and 21. Variable resistor 35 serves as a level setting element with regard to this effect.

Assuming a high total value of resistor 34 and variable resistor 35 most of the current from the collectors of transistors 20 and 21 will go through the more inviting paths offered by the collector resistors 22 and 23. As the total resistance of resistor 34 and the resistor 35 is reduced, more current will cross between the collectors and the collectors will approach the same potential. In practice variable resistor 35 is adjusted to obtain an output swing compatible with the rectifier.

The output leads 37 and 38 are, as shown in FIG. 4 connected directly to the collectors of transistors 20 and 21. Level setting resistor 24, which is common to transistors 20 and 21, is variable to adjust the equilibrium potential at the collectors of transistors 20 and 21. Level setting resistor 24 is adjusted such that the potential when no difference signal appears on inputs 7 and 8 is that required by the rectifier circuit, which is discussed next.

Finally it should be noted that the arrangement shown utilizing constant current from transistor 28 tends to bring the voltage swings at collectors 20 and 21 to a mean value dependent upon the difference of inputs on leads 7 and 8. Theoretically, of course, one lead increases in potential while a second decreases in potential the same amount. Any variations from this, however, will appear as a shift in potential across transistor 28 such that the increase in current across one emitter resistor 25 will be the same as the decrease across the other emitter resistor 26. This result follows from the requirements of circuit stability discussed above.

*Rectifier*

The output leads 37 and 38 are the inputs to the rectifier, shown in FIG. 5. The structure of the rectifier is as follows: Output leads 37 and 38 connect to back to back diodes 50 and 51. The common point of diodes 51 and 50 is connected to the base of transistor 52. The emitter of transistor 52 is series connected through the base-emitter junction of a transistor 53, through an emitter resistor 54, through a protective diode 55, to a 150 volt power source 56. The diodes 50, 51, and 55 and the emitter-base junctions of transistors 52 and 53 are all forward biased with respect to the 150 volt supply 56. The cascaded transistors 52 and 53 share a load resistor 57, which is connected to a level reducing 12 volt supply 58. The emitter of transistor 53 is connected to the base of transistor 59, which acts to current isolate transistors 52 and 53 from following circuits and to adjust the potential out of the rectifier configuration. Transistor 59 is connected in circuit with the 150 volt supply 56, a protection diode 60, a level reducing zener diode 61, a collector resistor 62, a potential reducing zener diode 63, and an emitter resistor 64. Capacitor 65 by-passes zener diode 63 to shunt noise and similar transients. The output lead 67 is connected across the emitter resistor 64.

The purpose of the rectifier is to give a potential swing in the same direction regardless of the direction of the potential swing on the inputs 37 and 38. Small currents through the emitter-base junction of transistor 52 are amplified by transistor 52 and all of this current appears across the emitter-base junction of transistor 53, where it is further amplified. Therefore, relatively small amounts of current flow through the diodes 50 and 51 and the primary potential drop is across the emitter resistor 54 of transistor 53. The small currents are negligible in the differential amplifier circuit thus giving rise to an effective open circuit across leads 37 and 38 as was stated without substantiation earlier in describing that circuit. The back to back configuration of diodes 50 and 51 is necessary to block circulation currents around the leads 37 and 38.

As previously discussed, leads 37 and 38 are at the same potential when the input signal to the coils of the cathode ray tube is one for zero deflection, and this potential may be adjusted with variable resistor 24. As a deflection signal appears, one of the leads 37 or 38 drops in potential while the other increases in potential. Analysis of the circuit traced from lead 38 through diode 50, directly to diode 51 and then to lead 37 shows that the potential at the connection point between diodes 50 and 51 must be the lesser of the potentials on leads 37 and 38. The only potential drop to satisfy the basic requirement that the potential around the loop be zero is a drop equal to the potential difference on leads 37 and 38 across the diode 50 or 51 which is connected to the lead 37 and 38 which is at the higher potential. It follows that as a potential difference appears on the leads 37 and 38, current from the 150 volts source 56 to the transistor 52 increases to satisfy the increased potential difference between the 150 volt source 56 and the common point of diodes 50 and 51.

The potential at the emitter side of emitter resistor 54 therefore is at its highest point when the input from leads 37 and 38 is the same. The potential decreases in direct proportion to the decrease in potential on either of the leads 37 and 38. Regardless of which of the leads 37 and 38 decreases in potential, the rectifier produces an output of the same configuration by tracking the lead of lowest potential. This accomplishes rectification of the type desired. It was established above that the potentials on leads 37 and 38 are directly proportional to the deflection potentials at the yokes of the cathode ray tubes and further that the change in potential on only one lead describes the total change in deflection at the CRT.

The rectifier is completed by the current isolating and potential shifting configuration of transistor 59 and its associated elements. The base of transistor 59 is connected to the emitter side of resistor 54. At maximum potential, indicative of no deflection at the CRT yoke, transistor 59 is biased to carry a relatively large current from the 150 volt source 56. Potential is reduced primarily by zener diode 63. The circuit is designed to have an output of just less than +50 volts when no deflection exists at the CRT. As a deflection appears at the CRT and one of the leads 37 or 38 drops in potential, the potential at the emitter side of transistor 53 drops, as described above. This reduces potential at the emitter of transistor 59. Since only small base currents are required, transistors 52 and 53 are current isolated from the output lead 67. In this manner, the output at lead 67 varies from just less than +50 volts to lesser values in direct proportion to the inputs to the differential amplifier circuit discussed above. The voltage reference point and extent of potential swing is selected to be compatible with the $x^2$ function generator, the next following circuit in the system, and with the logarithm $x$ function generator discussed below.

*Square function generator*

The $x^2$ function generator is shown in FIG. 8. Input lead 67 is the output lead from the rectifier. The basic configuration of the $x^2$ function generator consists of a transistor 80 with emitter bridge networks 81, 82, 83 and 84. The collector potential is clamped within certain values by a 28 volt source 85, and two resistors 86 and 87. A 50 volt source 88 provides transistor power. The bridge networks contain resistors 89A, 89B, 89C and 89D. Three of the networks contain diodes 90A, 90B, and 90C to link the 50 volt source 88 and resistors 91A, 91B and 91C. The resistors 91A, 91B, and 91C are connected to a zero volt point 92. The lead 93, connected between the series resistors 86 and 87 is the output lead.

As described in connection with the rectifier circuit, the input 67 is at just less than 50 volts when the deflection at the CRT is zero. Transistor 80 is therefore conducting a negligible amount of current since the input is substantially equal to the 50 volt source 88. The potential at the output lead 93 is at 28 volts by the action of the 28 volt source 85 through resistor 86, which carries no current when the input is maximum.

The potential input lead 67 decreases as yoke deflection appears at the CRT in the manner discussed above. The 50 volt power source then finds a path from emitter to base of transistor 80 and through lead 67, thus biasing the transistor for conduction at a current proportional to the emitter to base current. Emitter to collector current is also supplied by the 50 volt supply 88. The current path from the collector of transistor 80 is through resistors 87 and 86 to the 28 volt source 85. Output potential on lead 93 is 28 volts plus the potential generated by current through resistor 86.

The bridges 81, 82, 83, and 84 are critical in causing the output to be a function of the input on line 67. Different potentials are established across the diodes 90A, 90B, and 90C in accordance with the ratios of resistors 89B to 91A, 89C to 91B, and 89D to 91C. Important to this fact is that each of these resistor pairs are in circuit from the 50 volt source 88 to the zero volt point 92. Requirements of circuit equilibrium around such a circuit path establishes the potentials at each diode. The ratios 89B to 91A, 89C to 91B, and 89D to 91C are each different to bias each diode at a different potential.

The theory of circuit operation is as follows: When the input on line 67 is between 50 volts and the potential across all three diodes 90A, 90B, and 90C, current can flow to the transistor 80 only through bridge 81. Bridge 81 consists only of resistor 89A, which is a linear element. Transistor 80 also multiplies current linearly. Therefore, as input potential decreases, current from the collector of transistor 80 to the 28 volt source increases linearly. At a predetermined point, dependent upon the ratio of resistors 89D to 91C the potential on line 67 is insufficient to back bias the potential on diode 90C. The resistor 89D then becomes an effective part of the circuits controlling transistor 80. All of the elements are linear, but the reduced resistance appearing in the base circuit increases the slope of the output response as the input potential on line 67 drops. At a further reduced value of input on line 67 the diode 90B becomes conductive just as diode 90C previously became conductive. The slope of the output response again increases. Diode 90A becomes conductive at a further reduced input.

It is thus shown that the output on line 93 increases from 28 volts as a successive series of straight lines, each of greater slope, in response to decreasing potential on input line 67. By routine design choice, resistors in bridges 81, 82, 83 and 84 cause an output approximating any upwardly sloping function to be obtained. In the actual circuit under consideration the output is caused to approximate the function of a constant (the 28 volt starting point) plus the square of the input. More specifically, since the input represents CRT yoke deflection in the $x$ direction, the output is $x^2$. The circuit not dependent upon frequency, but instead generates the desired function of the input whether the input is static or varying.

*Addition of $x^2$ and $Y^2$*

Figure 7:
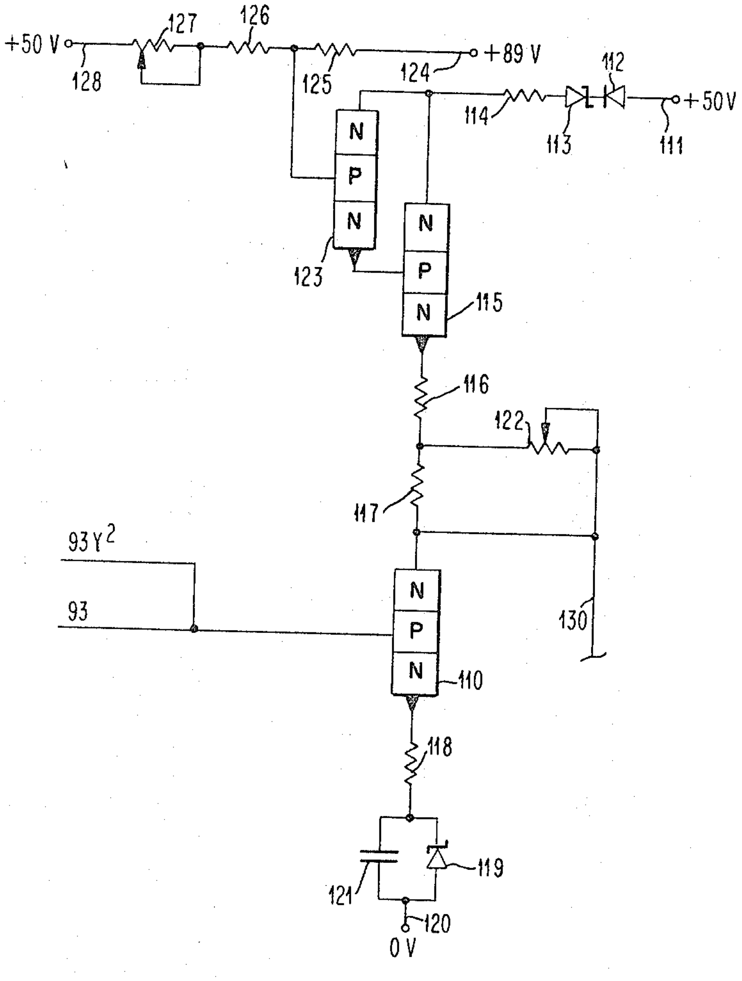
FIG. 7 shows an inverter which is responsive to the $x^2$ (or $y^2$) function generator to convert the signal into one compatible with the logarithm function generator.

The output of the $x^2$ function generator is connected to the inverter shown in FIG. 7. Lead 93 from the $x^2$ function generator is connected to the base of transistor 110. Also connected to the base at transistor 110 is the lead from a $y^2$ function generator, denominated $93y^2$. As was discussed in introducing the system under study, signals from the $y$ deflection yokes are processed by circuitry identical to, but separate from the circuitry which processes the $x$ deflection signals. However, an $x^2+y^2$ function is desired for use in obtaining a final correction function. For this reason the $x^2$ and $y^2$ functions are added before entering the inverter.

Figure 6:
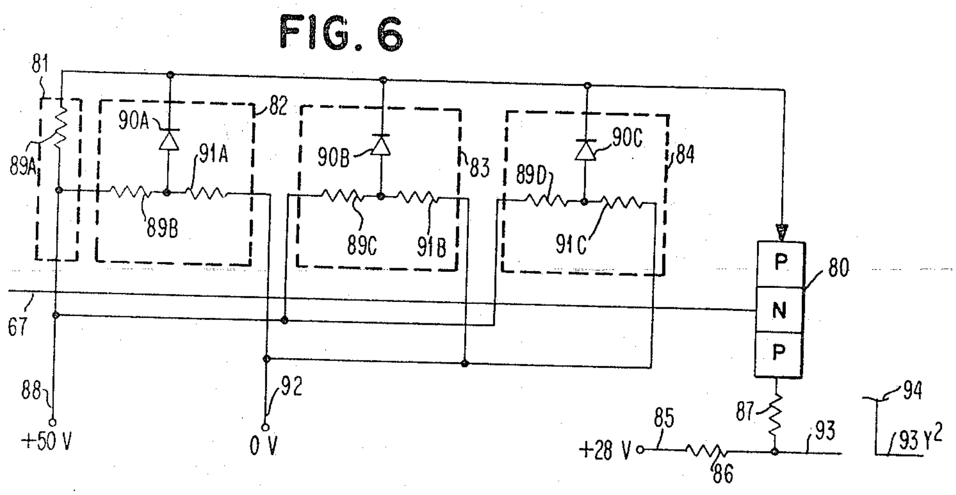
FIG. 6 illustrates the $x^2$ (or $y^2$) function generator which is responsive to the rectifier output and also illustrates the sum circuitry to obtain $x^2+y^2$.

It must be established, of course, that connecting leads 93 and lead $93y^2$ together gives a sum analogous to $x^2+y^2$. Generally, this is accomplished by use of the fact that a transistor is a current multiplier. Reference is made to FIG. 6 where a circuit identical to the one shown in detail is designated by numeral 94. This identical circuit 94 exists to produce a $y^2$ function. The lead $93y^2$ is connected to the lead 93 as shown in FIG. 7. The identical elements in the $y^2$ function generator will be given the same numerals as those elements in FIG. 6 followed by a $y^2$. The circuit diagram of FIG. 6 is sufficient since both are identical. As previously established, current increases through the transistor 80 in an approximation of the values $x^2$ and current increases through the transistor $80y^2$ in an approximation of the value $y^2$. Both currents see a parallel path through resistors 86 and $86y^2$ to 28 volt sources 85 and $85y^2$. It is clear that the parameters do not change with current. The current simply divides between resistors 86 and $86y^2$ and the potential at 93 and $93y^2$ is, in fact, a function of $x^2+y^2$.

*Inverter*

Referring again to FIG. 7. The inverter simply changes the direction of voltage swing and does not appear in the system diagram of FIG. 2 since that diagram was restricted to elements with substantial functions in implementing the scheme of correction. The inverter consists of a 150 volt power source 111, in series with a protective diode 112, a potential reducing zener diode 113, a collector resistor 114, a current limiting transistor 115, an emitter resistor 116, and a second emitter resistor 117. The circuit is completed by transistor 110, which has an emitter resistor 118 and potential reducing zener diode 119, connected to a zero volt point 120. The by-passing capacitor 121 is merely for noise and similar transients. Gain is controlled by the variable by-pass resistor 122. The level of the output is set by the transistor 123 activated by the 89 volt source 124 through resistor 125. The potential into transistor 123 is established by resistor 126 and variable resistor 127 connected to a 50 volt source 128. Lead 130, connected to the collector of transistor 110, is the output.

When the inverter is in operation, variable resistor 127 is adjusted to bring the output lead 130 to just less than 50 volts when the input on leads 93 and $93y^2$ is at 28 volts, the value when $x^2+y^2$ is zero. The cascade configuration of transistors 123 and 115 provides current isolation. The two power sources 128 and 124 are opposed to obtain stability in total potential, on the theory that both will vary in the same way with ambient conditions. The potential is divided through the circuit path through resistor 125, resistor 126, and variable resistor 127. Potential at the emitter of transistor 115 must be substantially the same as that at the point between resistors 125 and 126 because the path is almost a short circuit to potentials of the polarities used. Variable resistor 122 is adjusted to produce the gain desired.

Inversion of the input is obtained directly from the circuit as described. Inputs from leads 93 and $93y^2$ establish the potential drop from the base of transistor 110 to ground. As this potential increases with increases in $x^2+y^2$, larger currents must pass through transistor 110. The potential at the collector of transistor 110 and also at the output lead 130 drops with input in accordance with the drop in resistors 116, 117, and 122.

*Logarithm function generators*

This output is connected to a logarithm function generator. Since a plurality of logarithm function generators are used for somewhat different purposes, FIG. 8, which shows such a generator, will be described in general terms, it being understood that all logarithm function generators in the system are substantially the same. The logarithm function generator consists of an input lead 140 connected to the base of transistor 141. Emitter resistor 142 and variable emitter resistor 143 connect to a 50 volt power source 144. The collector has bridge circuits 145, 146, 147 and 148. Each bridge circuit has one resistor 149A, 149B, 149C, and 149D connected to zero volt points 150A, 150B, 150C, and 150D and three have second resistors 151A, 151B, and 151C in series with the 50 volt source 144. Diodes 152A, 152B, and 152C connect the junction of the bridge resistors to the collector of transistor 141. The collector of transistor 151 is also connected to the base of a first transistor 153, which is in cascade configuration with a second transistor 154. The circuit is completed by emitter resistor 155, connected to 50 volt power 50 volt 144. The collectors of transistors 153 and 154 are connected directly to a 12 volt source 156, which is merely to clamp the potential. The output line, connected to the emitter of transistor 154, is line 157.

When the logarithm function generator is in operation, inputs on line 140 are at just under 50 volts when a zero signal is represented. Inputs on line 140 decrease as the signal represented increases. Since input line 140 is in the emitter-base circuit of transistor 141, transistor 141 current increases directly as the signal increases. In basic theory, bridges 145, 146, 147 and 148 become conductive in the manner that bridges 81, 82, 83, and 84 in the $x^2$ function generator became conductive as was discussed in connection with FIG. 6. Without repeating that discussion, it should be clear that diodes 152A, 152B, and 152C will be backed biased when current through transistor 141 is small and the potential at the collector of transistor 141 will be established by the potential drop across resistor 149A. At a certain point, which is merely a design choice of the resistor ratios in the bridges 146, 147, and 148, diode 152A will become conductive while diode 152B and 152C are still backed biased. Further increases in current through transistor 141 divide through the two resistors 149A and 149B. Since they are in parallel, the increase at potential at the collector of transistor 141 with further increases in current is linear, but of less slope.

The operation of the current in FIG. 8 is thus seen to be a complement at that of the $x^2$ function generator of FIG. 5 in that the logarithm generator of FIG. 8 traces a curve which decreases in slope with increases in current through transistor 141. Just as discussed in connection with the $x^2$ function generator the diodes 152A, 152C, and 152B become forward biased successively to open different conduction paths so that the potential at the collector of transistor 141 traces a successive series of linear lines which approximate the curve desired. It is merely a design choice to select circuit elements such that the curve approximated is a logarithm of the input.

As illustrated in FIG. 8*a*, the function generated does not approximate a true logarithm function at small inputs. Generation of a true logarithm function would require the circuit to respond with an infinite range of outputs, a very difficult requirement to meet in a practical structure. The errors inherent in the functions generated are rendered negligible in this preferred embodiment by subtracting a constant value from the sum of the logarithmic functions generated and by the use of an antilogarithm function generator that does not respond to the output of the summing circuit until a certain value is reached. Furthermore, the antilogarithm function generated contains a modification which tends to cancel the inaccuracies of the logarithmic functions.

Cascaded transistors 153 and 154 merely serve as an isolation stage between the collector of transistor 141 and the output line 157, and do not participate in generating the desired function. Isolation is obtained in accordance with the following discussion: The emitter of transistor 154 must stay at substantially the same value as the potential of the collector of transistor 141 since the potential drops across the emitter-base junctions of transistors 153 and 154 does not vary with current and is small in value. The cascade configuration produces very large current multiplication, however, thus effectively isolating output 157 from the bridge circuits 145, 146, 147, and 148. Power out is supplied by the 50 volt source 144.

*Summing and reduction of logarithms*

In satisfying the correction formula it is necessary to add the logarithm of $x$ (or $y$) to the logarithm of $(x^2+y^2)$. This is accomplished by the summing circuit shown in FIG. 9. Also, a constant value is subtracted from the sum. The signal from the logarithm $(x^2+y^2)$ generator is carried by line 170 to transistor 172. The signal from the logarithm $x$ (or $y$ depending upon which addition circuit is being described) is carried by line 171 to transistor 173. Transistor 172 has emitter resistor 174 and transistor 173 has emitter resistor 175, both of which are connected to a point of zero potential 190. The collectors are connected in common to the collectors of transistors 176 and 177. The base of transistor 176 is connected through lead 178 to the emitter of transistor 177. The emitter of transistor 176 is connected through resistor 179 and variable resistor 180 to 89 volt power source 181. The 89 volt power source 181 is connected to the base of transistor 177 by a resistor 182. Transistor 177 is connected through a parallel configuration of zener diode 183 and capacitor 184 to the 50 volt power source 185. The 50 volt power source 185 is connected to the collectors of the transistors 172, 173, 186, and 177 through a variable resistor 186 in series with resistor 187 and also through a parallel path through back biased protective diode 188. The output line 189 is also connected to the collectors of the transistors 172, 173, 176, and 177.

The basic operation of the circuit consists of the cooperation between the potential source 185 and the transistors 172 and 173. Inputs on the leads 170 and 171 pass directly through the bases of the transistors 172 and 173 to the point of zero potential 190, and the current response through each transistor is thus directly proportional to the input signals. The currents from transistors 172 and 173 both pass through resistors 186 and 187 to create a potential drop proportional to the total current.

In order to obtain substraction transistors 176 and 177 with their associated circuitry are arranged to constitute a highly stable constant current source which subtracts from the output currents which appear on resistors 186 and 187. The cascade arrangement through lead 178 effectuates a high total current gain to render current from the base of transistor 177 relatively negligible and thus assure constant total current at the collectors of transistors 176 and 177 regardless of changes in the characteristics of transistors 176 and 177 due to ambient conditions. The 89 volt source 181 and the 50 volt source 185 are in opposition to provide a stable potential, the theory being that both power sources will vary about the same amount with changes in ambient conditions. Zener diode 183 provides a potential drop to a level which will provide current of the magnitude desired. Resistor 182 provides a path to bring current through zener diode 183 such that it operates within the proper range of its characteristic curve. Capacitor 184 is merely a by-pass for noise and similar transients. The constant current output is adjusted simply by varying resistor 180.

It is clear that currents from transistors 176 and 177 oppose currents from transistors 172 and 173. Therefore, the output on line 189 reflects the currents representative of logarithms less the constant current. The circuit is designed so that the line 189 has just less than 50 volts when a correction signal is desired at the yoke of the CRT. As increased inputs appear on lines 170 and 171, the output drops as a direct function of the sum of the inputs.

*Antilogarithm function generator*

In accordance with the correction scheme, the sum of the logarithms function is finally processed in the antilogarithm function generator circuit of FIG. 10. The antilogarithm function is, of course, one in which the slope increases with input. For that reason the function generator of FIG. 10 is only a variation of the $x^2$ function generator discussed in connection with FIG. 6. Except for the design choice of parameter magnitudes to obtain an antilogarithm generator, the transistor 200 the resistors 201A, 201B, 201C, and 201D the diodes 202A, 202B, 202C and the second resistors 203A, 203B and 203C leading to the point of zero potential 204 cooperate in the manner discussed with the bridging arrangement of FIG. 6. For further description of the structure and operation under consideration reference is made to FIG. 6, which is similar in function and operation.

To obtain a small, constant potential which will assure immediate response at the output when an input signal appears, the circuit also contains collector resistor 205 in series with a second resistor 206 which is connected to ground. A second transistor 207 is part of a parallel arrangement from the junction of resistors 206 and 205 through emitter resistor 208 and variable resistor 209 to a 50 volt power source 210, which is also the power source for transistor 200. Transistor 207 is constantly regulated by a 28 volt power source 211.

To current isolate the output from the rest of the circuit, the base of transistor 212 is connected to the junction of resistors 206 and 205. The emitter of transistor 212 is connected to a cascade configuration to the base of transistor 213, the by-pass resistor 214 is of relative high magnitude. Emitter resistor 215 leads to ground. Collector lead 216 is, functionally, the output lead and will have a positive potential impressed upon it in the manner made clear in the discussion which follows concerning the selection switch and yoke input.

Current from transistor 200 will increase as the input from lead 189 decreases, and that current will be a successive series of straight line approximations of the antilogarithm curve. Transistor 207 and its resistors 208 and 209 along with the 50 volt power source 210 impress a relatively small constant current through resistor 206. Currents from both transistors 200 and 207 combine in resistor 206 to produce a potential drop across resistor 206 proportional to the total current. The constant current from transistor 207 is required merely to create a constant potential at the base of transistors 212 and 213 to overcome the built-in voltage (inherent, small back potential) of transistors 212 and 213. With the built-in voltage constantly overcome, potential changes due to the input appear immediately on output lead 216.

FIG. 10*a* shows the function generated. It is not a close approximation of an antilogarithm function at small inputs, but instead increases linearly from zero at zero input. Nothing is generated at inputs larger than about 50 volts. Since the input on line 189 is not at 50 volts until the constant current of the summing circuit is overcome, small intermediate signals of the correction scheme do not appear as an output of the antilogarithm function generator.

The beginning of the antilogarithm function at zero output when inputs become effective contributes an improvement to this specific embodiment which is of importance. It should be clear that the substantially inaccurate portions of the logarithm functions generated are all too large. It would be acceptable to inhibit all corrections which contain inaccurate portions of the logarithm function. In the preferred embodiment this is not done. Instead the antilogarithm function cancels some of the inaccuracies by beginning at zero where a true antilogarithm function would be at one. Logarithm signals are therefore allowed to pass while still somewhat too large and the antilogarithm effectuates a rough, but useful and reasonably accurate, cancellation of the errors in the logarithm functions.

The transistors 212 and 213 are in cascade to isolate the output 216 from the input in the manner fully discussed above in connection with the transistors 153 and 154 of the logarithm function generators of FIG. 8. For further description of the operation of this isolation stage, reference is made to FIG. 8. Resistor 214 across the base-emitter junction of the transistor 213 is of relatively high magnitude and provides a path to ground to stray currents. The potential on output line 216 originates from a relatively complex circuitry which will be fully discussed below.

*Selection switch*

Since two coils control deflection in each direction the selection switch is needed to route the correction signal to the proper coil. The lead 216 is connected to the selection switch shown in FIG. 11. The two input leads 37 and 38 on the left are the outputs of the differential amplifier circuit described in connection with FIG. 4. Lead 37 connects to the base of transistor 230, the emitter of which is connected to the base of transistor 231. The base-emitter junction of transistor 230 is by-passed by resistor 232, which is of relatively high magnitude. The emitter of transistor 231 is connected through protective diode 233 to emitter resistor 234, which is connected to variable resistor 235. An identical network is connected to lead 38, containing transistors 236 and 237, resistor 238, diode 239, and emitter resistor 240. The tap on variable resistor 235 is connected through resistor 241 to a 137 volt power source 242. The collectors of transistors 230 and 231 are connected to ground through resistor 243. The collectors of transistors 236 and 237 are connected to ground through resistor 244.

This circuit responds to a different potential on leads 37 and 38 to indicate the relative potentials on the two leads 37 and 38 in the following manner: The cascade configuration of transistors 230 and 231 activated through lead 37 and the cascade configuration of transistors 236 and 237 activated through lead 38 provide very large current gain to assure that current drain on leads 37 and 38 will be negligible to the differential amplifier circuit. Resistors 232 and 238 are relatively large and are operative primarily to assure proper biasing when the transistors are biased off in the manner discussed below. Although the 137 volt power source 242 is current isolated from leads 37 and 38 by the cascaded transistors, substantial current from the 137 volt power source 242 passes through the transistors to bring the potentials in the circuits into balance. The potentials at the base of transistors 230 and 236 will equal the potentials on the leads 37 and 38 respectively. Since the bases of transistors 230, 231, 236 and 237 are forward biased, current must flow in resistors 234, 235 and 240 sufficient to create the necessary potential drops. Variable resistor 235 is theoretically center tapped and is variable only to achieve an exact balance of the circuit.

Current from the collectors of transistors 230 and 231 is thus proportional to the potential on line 37. It flows through resistor 243 to ground. Current from the collectors of transistors 236 and 237 is proportional to the potential on line 38. It flows through resistor 244, which is identical in magnitude to resistor 243, to ground. The potential from the collector side of resistor 243 to the collector side of resistor 244 is, of course, the total potential drop across those points. Since the currents flow in opposite directions, total potential will have a value dependent in both magnitude and polarity of the difference of potentials on 37 and 38.

Resistor 241 is of relatively high magnitude to increase the resolution (sensitivity) of the circuit. Since the magnitude of resistor 241 reduces current in the differential amplifier, only a small difference of potentials need appear on leads 37 and 38 before one of the set of transistors 230 and 231 or transistors 236 and 237 becomes back biased. In this way only one current in one direction flows in one of either resistor 243 or resistor 244. Such a definite shift will appear as the desired potential condition regardless of many imperfections in the circuit shown. Resistors 232 and 238 serve to assure that the back bias, when it is created, appears directly across the emitter-base junction of either transistor 231 or transistor 237 in the set biased off.

The rest of the circuit of FIG. 11 responds to the potential difference of the differential circuit just described to route the correction signal to the proper coil. The base of transistor 250 is connected to the collector of transistor 230. The emitter of transistor 250 is connected to the base of transistor 251 to form a current isolating configuration similar to that used in the differential circuit. By-pass resistor 252 across the base-emitter junction of transistor 250 is relatively large. The collectors of transistors 250 and 251 are connected through resistor 253 to the lead 7. An identical configuration exists at the collector of transistor 236, the configuration consisting of transistors 254 and 255, by-pass resistor 256, output resistor 257, and lead 8. The base of transistor 250 connects through resistor 258 to a 50 volt power supply 259. Similarly the base of transistor 254 connects through resistor 260 to the 50 volt power supply 259. The emitters of transistors 251 and 255 are connected through resistor 261 to lead 216.

Selection switch operation must be considered in relation to the other circuits with which it is connected. The leads 7 and 8 are the yoke potential taps fully discussed in connection with FIG. 3. The correction current generated by the multiple coactions of the entire system will be impressed on leads 7 and 8. Lead 216 is the output lead from the antilogarithm function generator discussed in connection with FIG. 10. When a difference signal appears across resistors 243 and 244 due to the difference on inputs 37 and 38, the emitter-base junctions of one of either the transistor pair 250 and 251 to transistor pair 254 and 255 must become back biased. Resistors 252 and 256 serve to assure that the back bias appears directly across the emitter-base junction of either transistor 251 or transistor 255, depending upon which pair is biased off. In this way one of the leads 7 and 8 is selected, and, of course, the entire circuit is arranged so that selection of the lead 7 or 8 will be the one to correct deflection in the proper direction. The parameters of the selection switch are selected to create a relatively large potential across either transistor pair 250 and 251 or transistor pair 254 and 255 which is forward biased. Current flow is restricted only by the biasing of transistor pair 212 and 213 in the antilogarithm function generator of FIG. 10. Since control of current is at the antilogarithm function generator, the selection switch serves its proper function of only choosing the proper lead 7 or 8.

Finally, it should be established that the lead 7 or 8 is selected in the specific embodiment shown so that correction in the proper direction does occur. Assume that lead 7 is at a higher potential than lead 8. This, of course, is established by the potential of the deflection coils shown in FIG. 3. At the differential amplifier circuit of FIG. 4 the higher potential on line 7 then on line 8 is transformed to a lower potential on line 37. The rectifier of FIG. 3 tracks the potential. The differential circuit of FIG. 11 responds to both leads 37 and 38, bringing a higher positive potential on the collector side of resistor 244 than on resistor 243. Transistor pair 250 and 251 is therefore back biased. Transistor pair 254 and 253 is forward biased, thus activating lead 8.

*Yoke input*

Reference is now made to FIG. 12 which shows the preferred CRT deflection system with which the embodiment is concerned. As will be made clear shortly, the deflection system of this specific embodiment allows the correction to appear in such a way that it does not modify the input potential and the total correction becomes substantially the input minus the correction. With other deflection schemes it would be possible that the correction might modify the input potential so that the final deflection caused by the entire scheme when corrected would be somewhat different from the correction of the preferred embodiment of this invention. Tolerances of a correction scheme generally are not absolutely critical, however. Therefore, the correction system of this invention is compatible with most CRT deflection systems. Signals observed at the deflection means will be representative of the amount of beam deflection within the requirements of this invention regardless of whether the correction system modifies the signals observed. It should also be noted that this invention does not extend to the deflection system used, but instead is concerned with generating a correction signal. The deflection system is described only to clarify the preferred embodiment of the invention.

For clarity and economy of expression, FIG. 12 shows only one deflection coil. It will be understood of course that the specific embodiment contains two deflection yokes each made up of two coils as illustrated in FIG. 3. FIG. 12, of course, shows much of the structure of FIG. 3, in particular the leads 3 and 3′ the deflection coil 1, the 50 volt power source 9, resistor 10 to the coil and lead 7. Also shown in FIG. 12 is the input 270 which operates in a range somewhat less than the 50 volt power source 9. The input value changes linearly with the dimensions of the picture to be displayed. Input 270 is connected to the base of transistor 271. The emitter of transistor 271 is connected to the coil 1 and the lead 7 at electrically common point 5. The collector of transistor 271 is connected to a high gain current amplifier 272 and to ground through resistor 273. Lead 3 connects with the high gain current amplifier 272, and lead 3′ connects with the emitter of transistor 271.

When the yoke input circuitry is in operation, assuming no correction current, the input 270 is less than and opposed by the 50 volt source 9. The input at 270 has a substantially unobstructed path to point 5, which of course is electrically identical to lead 7. Some current must flow in the emitter-base junction of transistor 271 to activate that transistor. When the transistor is activated, however, the high gain current amplifier 272 begins to become operative. To the extent that the high gain current amplifier 272 is activated, current from the 50 volt source 9 through resistor 10 sees a low resistance path through coil 1 to the high current gain amplifier 272. Current through the emitter-base junction of transistor 271 therefore increases only to the point necessary to create a gain in high gain current amplifier 272 sufficient to balance the circuit. The potential at point 5 from the 50 volt source 9 is reduced by current-resistance drop at resistor 10 and must be substantially that of the input. Substantially all of the current passes through the coil 1. The entire circuit is a power amplifier with current through the coil 1 responding substantially linearly to input voltage at input 270.

The correction circuit cannot change the potential at point 5 under normal operating conditions. It does, however, deprive the coil 1 of current, which effectuates the necessary correction. Assuming that the line 7 is connected to the correction circuits by the selection switch as fully discussed above, the input potential nevertheless appears at point 5 and therefore the same current as before correction was switched in must flow through the resistor 10 from the 50 volt power source 9. Some of this current, however, must flow through the line 7 to obtain equilibrium in the correction circuit. From this it follows directly that current in the coil 1 is reduced to the extent that current flows through the line 7.

Figure 1:
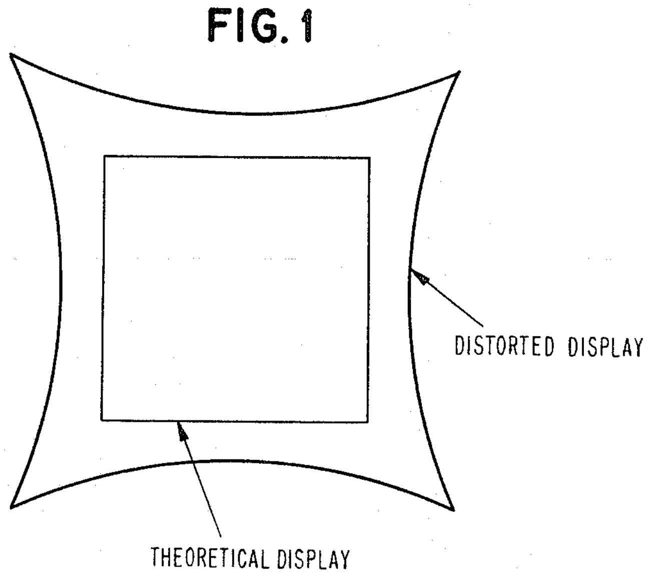
FIG. 1 illustrates how pure pin cushion distortion appears in relation to the true display.

The analysis just completed dictates why in the specific example in which the lead 7 was assumed to be at higher potential than lead 8 the switch selected lead 8 as to be connected to the antilogarithm function generator. The decreased potential on lead 8 indicated a higher current through coil 2, as shown in FIG. 3, than in current flowing in coil 1. It will be recalled that the yokes are in push-push configuration. To correct pin cushion distortion of the type shown in FIG. 1 reduction in the amount of deflection is required. This is accomplished when current to the coil 2 is diverted through the lead 8.

While the invention has been particularly shown and described with reference to a preferred embodiment thereof, it will be understood by those skilled in the art that the foregoing and other changes in form and details may be made therein without departing from the spirit and scope of the invention.

I claim:

1. In a system to correct trace distortion of a cathode ray tube comprising plural means to generate an intermediate logarithmic function in a final correction formula, including means to reduce said intermediate function by a constant amount, plural antilogarithmic function generating means responsive to relatively large values of said reduced intermediate logarithmic function to generate a final correction function, and plural means to modify deflection in said cathode ray tube in accordance with said final correction function.

2. A system to correct trace distortion of a cathode ray tube comprising plural means to generate a modified logarithm which is substantially accurate at relatively large values of at least one element of a scheme of correction, plural means to generate a modified antilogarithm which is substantially accurate at relatively large values controlled in accordance with said scheme of correction by said modified logarithm, and means to bar implementation of said scheme of correction when beam deflection in said cathode ray tube in the direction of correction is relatively small.

3. The system according to claim 2 wherein said plural modified antilogarithm function generating means generates a function which increases at relatively substantial slope from a reference point with increasing relatively small inputs.

4. The system according to claim 2 wherein said plural modified antilogarithm function generating means generates function which varies substantially linearly with small inputs to join substantially tangentially the substantially accurate portion of said modified antilogarithm function.

5. In a cathode ray tube deflection system wherein deflection is effected in one direction $x$ and in an orthogonal direction $y$ and signals primarily describing deflection in said $x$ direction are $x$ functions and signals primarily describing deflection in said $y$ direction are $y$ functions, a correction system comprising:

function generating means to generate a function analogous to $x^2$, function generating means to generate a function analogous to modified logarithm $x$ which is substantially accurate at relatively large values of $x$, function generating means to generate a function analogous to $y^2$, means to sum said functions analogous to $x^2$ and $y^2$, function generating means to generate a function analogous to the modified logarithm of said sum $x^2+y^2$ which is substantially accurate at large values of said sum $x^2+y^2$, means to sum said function analogous to modified logarithm $x$ and said function analogous to modified logarithm $(x^2+y^2)$, function generating means to generate a first modified antilogarithm function which is substantially accurate at large values analogous to the modified antilogarithm of said sum of said modified logarithm $x$ and modified logarithm $(x^2+y^2)$, means to modify deflection in said $x$ direction in accordance with said first modified antilogarithm function, means to inhibit $x$ direction correction when deflection in the $x$ direction of the beam of the cathode ray tube is relatively small, function generating means to generate a function analogous to modified logarithm $y$ which is substantially accurate at relatively large values of $y$, means to sum said function analogous to modified logarithm $y$ and said function analogous to modified logarithm $(x^2+y^2)$, function generating means to generate a second modified antilogarithm function which is substantially accurate at relatively large values analogous to the modified antilogarithm of said sum of said logarithm $y$ and modified logarithm $(x^2+y^2)$, means to modify deflection in said $y$ direction in accordance with said second modified antilogarithm function, and means to inhibit $y$ direction correction when deflection in the $y$ direction of the beam of the cathode ray tube is relatively small.

6. The system according to claim 5 wherein said modified logarithm function generating means and modified antilogarithm function generating means generate functions which increase at relatively substantial slope from reference points with increasingly relatively small inputs.

7. The system according to claim 6 wherein both said means to inhibit corrections include means to insert a constant electrical parameter into the correction system which renders signals ineffective which are so small that the compensating characteristics of said modified logarithm and said modified antilogarithm functions are not sufficient to create a reasonably accurate correction signal.

8. In a cathode ray tube deflection system wherein deflection is effected in one direction $x$ and in an orthogonal direction $y$ and signals primarily describing deflection in said $x$ direction are $x$ functions and signals primarily describing deflection in said $y$ direction are $y$ functions, a correction system comprising:

function generating means to generate a function analogous to $x^2$, function generating means to generate a function analogous to modified logarithm $x$ which is substantially accurate at relatively large values of $x$, function generating means to generate a function analogous to $y^2$, means to sum said functions analogous to $x^2$ and $y^2$, function generating means to generate a function analogous to the modified logarithm of said sum $x^2+y^2$ which is substantially accurate at large values of the sum of $x^2+y^2$, means to sum said function analogous to modified logarithm $x$ and said function analogous to modified logarithm $(x^2+y^2)$, function generating means to generate a function which is substantially accurate at relatively large values analogous to the modified antilogarithm of said sum of said modified logarithm $x$ and modified logarithm $(x^2+y^2)$, means to modify deflection in said $x$ direction in accordance with the function generated by said modified antilogarithm function generator, and means to inhibit $x$ direction correction when deflection in the $x$ direction of the beam of the cathode ray tube is relatively small.

9. The system according to claim 8 wherein said modified logarithm function generating means and modified antilogarithm function generating means generate functions which increase at relatively substantial slopes from reference points with increasing relatively small inputs.

10. The system according to claim 9 wherein said means to inhibit $x$ direction corrections includes means to insert a constant electrical parameter into the correction system which renders signals ineffective which are so small that the compensating characteristics of said modified logarithm and said modified antilogarithm functions are not sufficient to create a reasonably accurate correction signal.

11. In a cathode ray tube deflection system wherein deflection is effected in one direction $x$ and in an orthogonal direction $y$ and signals primarily describing deflection in said $x$ direction are $x$ functions and signals primarily describing deflections in said $y$ direction are $y$ functions, a correction system comprising:

function generating means to generate a function analogous to $x^2$, function generating means to generate a function analogous to logarithm $x$, function generating means to generate a function analogous to $y^2$, means to sum said functions analogous to $x^2$ and $y^2$, function generating means to generate a function analogous to the logarithm of said sum $x^2+y^2$, means to sum said function analogous to logarithm $x$ and said function analogous to logarithm $(x^2+y^2)$, function generating means to generate a function analogous to the antilogarithm of said sum of said logarithm $x$ and logarithm $(x^2+y^2)$, and means to modify deflection in said $x$ direction in accordance with the function generated by said antilogarithm function generator.

12. In a cathode ray tube deflection system wherein deflection is effected in one direction $x$ and in orthogonal direction $y$ and signals primarily describing deflection in said $x$ direction are $x$ functions and signals primarily describing deflection in said $y$ direction are $y$ functions, a correction system comprising:

function generating means to generate a function analogous to $x^2$, function generating means to generate a function analogous to logarithm $x$, function generating means to generate the function analogous to $y^2$,
means to sum said functions analogous to $x^2$ and $y^2$,
function generating means to generate a function analogous to logarithm of said sum $x^2+y^2$,
means to sum said function analogous to logarithm $x$ and said function analogous to logarithm $(x^2+y^2)$,
function generating means to generate a first antilogarithm function analogous to the antilogarithm of said sum of said logarithm $x$ and logarithm $(x^2+y^2)$,
means to modify deflection in said $x$ direction in accordance with said first antilogarithm function,
function generating means to generate a function analogous to logarithm $y$,
means to sum said function analogous to logarithm $y$ and said function analogous to logarithm $(x^2+y^2)$,
function generating means to generate a second antilogarithm function analogous to the antilogarithm of said sum of logarithm $y$ and logarithm $(x^2+y^2)$,
and means to modify deflection in said $y$ direction in accordance with said second antilogarithm function.

References Cited by the Examiner

UNITED STATES PATENTS 2,620,456 12/1952 White ------------ 315—26 X

OTHER REFERENCES

Zimmerman and Mason, Electronic Circuit Theory. John Wiley and Sons, New York, 1962, p. 76.

DAVID G. REDINBAUGH, *Primary Examiner.*

T. A. GALLAGHER, *Assistant Examiner.*

UNITED STATES PATENT OFFICE

CERTIFICATE OF CORRECTION

Patent No. 3,308,334 March 7, 1967

Bobby L. Bryson

It is hereby certified that error appears in the above numbered patent requiring correction and that the said Letters Patent should read as corrected below.

Column 1, lines 57 to 59, the formula should appear as shown below instead of as in the patent:

$$A \otimes B = \frac{(A+B)^2 - (A-B)^2}{4}$$

column 12, line 8, for "substraction" read -- subtraction --.

Signed and sealed this 7th day of November 1967.

(SEAL)
Attest:

Edward M. Fletcher, Jr.
Attesting Officer

EDWARD J. BRENNER
Commissioner of Patents